Dec. 23, 1969 G. W. CARR 3,485,523

TRAILER REAR HEADER STRUCTURE

Filed July 31, 1967

Inventor
George W. Carr

By Richard J. Myers
Attorney

United States Patent Office 3,485,523
Patented Dec. 23, 1969

3,485,523
TRAILER REAR HEADER STRUCTURE
George W. Carr, Cincinnati, Ohio, assignor to Pullman Incorporated, Chicago, Ill., a corporation of Delaware
Filed July 31, 1967, Ser. No. 657,221
Int. Cl. B62d 25/08
U.S. Cl. 296—28      15 Claims

ABSTRACT OF THE DISCLOSURE

A trailer rear header structure comprising an aluminum one piece extruded beam disposed at the upper rear end of the trailer between the rear corner casting and above the trailer or container doors, the beam having a forward upright generally C-shaped flange portion, the top of which extends rearwardly and has attached thereto the roof sheet, the extruded beam also having a rearward upper C-shaped flange portion facing the forward C-shaped flange portion and connecting therewith by means of a trough plate portion, the rearward C-shaped flange portion having a lower depending C-shaped flange portion provided with a drip lip cooperative with a door seal connecting the lower C-shaped flange with the door, the upper C-shaped flanges defining a trough area that communicates with drainage openings in the rear corner castings of the trailer to allow water run-off, the upper rearward flange portion being at a lower elevation than the upper forward flange portion for protecting both the rearward and forward upper C-shaped flange portions.

BACKGROUND OF THE INVENTION

Field of the invention

This invention relates to the construction of trailer bodies or containers which may be mounted on a bogie for highway transportation. In particular, the invention relates to the rear header construction of the upper rear end of the trailer body or container wherein there is provided a strengthened unit of light weight simplified construction and having water run-off means and sealing means.

Description of the prior art

It has heretofore been known to provide for a rear header or main upper end frame construction for a trailer body or container but the trailer frame structure has been heavy and quite expensive to make and therefore it is desired to get an inexpensive light weight product. Also it is desired to have a header construction that provides sufficient and adequate run-off of the water from the rear end of the trailer and yet to provide adequate sealing means between the header construction and the trailer or container door. It is these deficencies and others in the art of constructing rear headers for trailers that the invention overcomes.

SUMMARY OF THE INVENTION

This invention relates to a unique and novel rear header construction for a trailer body or a trailer container wherein the header construction is of a one-piece extrusion such as a light metal like an aluminum extrusion which provides an overhead water trough for carrying the water away from the rear end of the trailer roof to the corner castings and out of the trailer. Also the outside of the inner cube of the container is also between the header construction and the trailer doors. The aluminum extrusion defines a structural beam that withstands horizontal forces in the container and also assures the required strength in attachment to the side of the castings. Simple attachment of the roof sheet to the outside of the inner cube of the container is also provided for in this invention and since the rear roof sheet is placed so far from the rear wall of the container, it is less vulnerable to damage. Since the construction affords for the rear upper edge of the header to be lower, such edge is therefore less vulnerable to damage. The invention also provides for a drip lip over the door seal which assures better sealing between the rear header and the door. This inventive one-piece extrusion produces one finished header of unitary construction with every cut of the saw. These and other objects and purposes, and advantages of the invention will become more clear from reference to the following description.

DESCRIPTION OF THE PREFERRED EMBODIMENT

Figure 1:
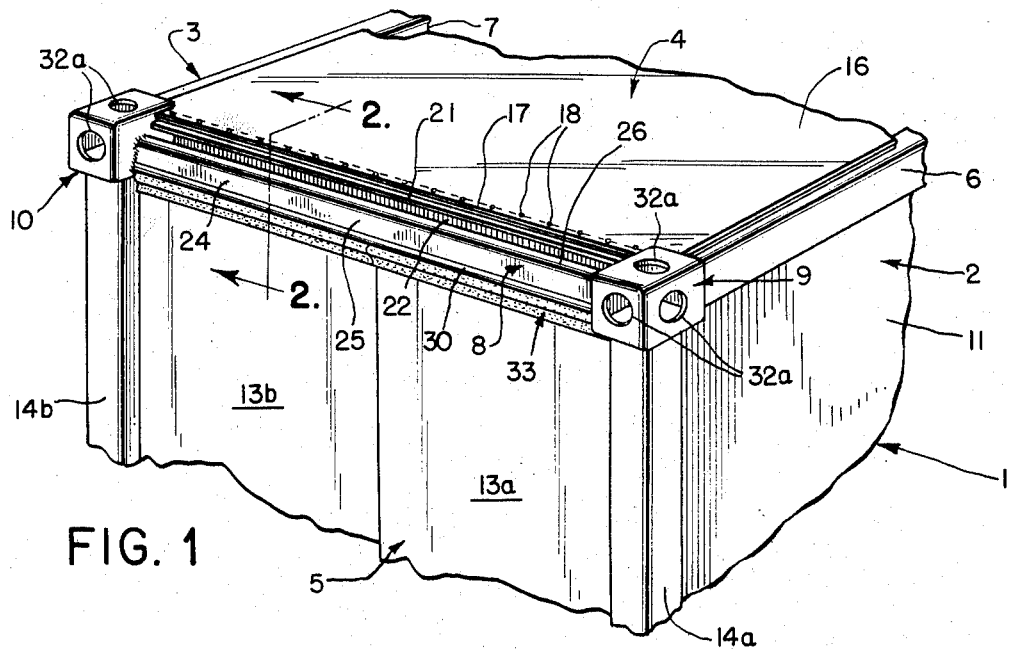
FIG. 1 is a partial view showing the rear upper end of a trailer body or a trailer container.
Figure 2:
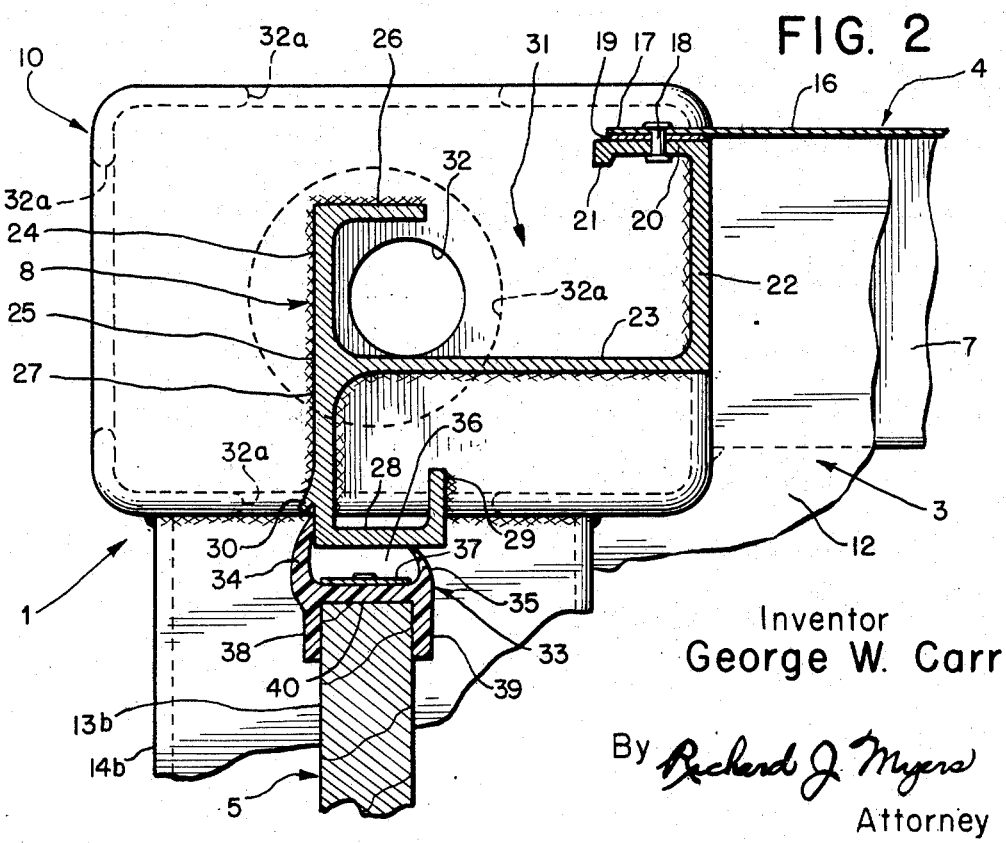
FIG. 2 is a sectional view taken along line 2—2 of FIG. 1.

With reference now to the drawing, there is shown in FIG. 1 a partial view of a trailer body or container 1 having sides 2 and 3 and a top 4 and a rear portion 5. The upper part of the trailer is provided with side headers 6 and 7 and a read header 8. At each of the rear corner portions of each rear corner of the trailer or container there is provided a rear side of corner casting 9 or 10 Side sheets 11 and 12 are respectively riveted to rear posts 14a and 14b. The rear 5 of the container 1 is provided with doors 13a and 13b.

A roof sheet 16 has its end 17 attached to the forward horizontal flange 20 of the rear header 8 by rivet means 18 with sealing tape 19 placed therebetween and between the attachment of the roof sheet and side sheets to the side headers 6 and 7. The forward horizontal flange 20 which is the most forward upward portion of the novel rear header arrangement 8 is provided with a downwardly projecting bulbous end and connects forwardly with the downwardly extending forward vertical web 22 of the structure 8 and a horizontally extending water trough floor and divider plate 23 connects flange or web portion 22 with the rear upper vertical flange portion 24 of the rear vertical flange or web 25 of the header 8. A rear upper edge flange portion 26 extends inwardly but below and spaced apart from the rear end facing flange 20 and connects with the upper flange 24. The vertical flange 25 is also provided with a lower vertical flange or web portion 27 which connects with an inwardly directed rear lower edge flange 28 having an upturned end flange portion 29 acting as a strengthener for the flange 28. The upper rearward and forward flanges 22 and 24 and flange 23 define a trough area 31 and the lower depending flange portion 27 is provided with a downwardly outwardly extending drip lip 30.

The trough area 31 communicates with the interior of the corner castings 9 and 10 by way of corner castings openings 32. The water passing from the trough area 31 into the corner castings exits from the corner castings by way of corner casting openings 32a. A door seal 33 is interposed between the rear header structure 8 and the door parts 13a and 13b of rear 5 and comprises an upward outer seal lip 34 engaging underneath the drip lip 30 and on the outer side of the lower flange portion 27. The seal 33 is also provided with an upper inner seal lip 35 that tapers as does the seal lip 34, the inner seal lip 35 tapering and engaging the underside of the flange portion 28. The seal 33 is generally H-shaped with its upper portions being seal lips 34 and 35 and its lower seal portions being leg portion 38 and 39, the outer seal leg 38 being against the outside of the door parts 13b and the inner seal leg 39 being against the inside of the door parts to thus provide an adequate seal between the rear header 8 and the door parts 13b. The seal 33 is provided with a transverse portion 40 interconnecting the seal leg portions 34, 38 and 35, 39 and is held fastened on the top of the door 13b by tiedown or fastening means 37.

It is noted that the header structure 8 is elongated transversely of the trailer body or container 1 to provide a laterally extending elongated trough means 31 for dumping of water flow into the end corner castings 10 and 9. It is seen that the frame construction of the header 8 has a pair of upward generally C-shaped portions 24 and 22 facing one another to define the trough 31 and a lower C-shaped portion provided for strengthening and reinforcing of the header arrangement 8. Since the upper forward C-shaped flange portion, as defined by portions 20, 22 and 23, extends above the outer upper C-shaped flange portion, as defined by portions 23, 24 and 26, the roof sheet attachment to the header construction is protected as it is inwardly of the rear of the trailer body and also the rear flange portion 26 of the header 8, being lower, is less subject to damage. It is seen that this is an unique one-piece extruded header construction 8 produced by a single cut of the saw and the aluminum extrusion 8 provides a structural beam to withstand horizontal forces in the container and also assures the required strength in the attachment of the side castings and provides for attachment of the roof sheets outside of the inner cube of the container. The drip lip construction over the door seal assures better sealing condition.

The foregoing description and drawings merely explain and illustrate the invention and the invention is not limited thereto, as those skilled in the art who have the disclosure before them will be able to make modifications and variations therein without departing from the scope of the invention.

What is claimed is:

1. A rear header construction for a trailer or container or the like comprising:
   a one piece aluminum extrusion member having a lateral extension for adaptation to the rear end of the trailer and being provided with an upper upstanding outer flange and an upper upstanding inner flange and a horizontal load transferring beam portion connecting the lower ends of the outer and inner flanges to define a trough, and
   a lower vertically depending flange portion connecting with the horizontal beam portion and the outer flange to present a generally T-shaped load supporting beam structure,
   seal means engaging the underside of said lower flange portion, said seal having portions embracing the upper edge portions of an associated trailer door or the like, the said header construction adapted for connection to apertured trailer corner fittings for transferring of drainage from the trailer extrusion member to the fittings and outwardly of the trailer.

2. The invention according to claim 1, and said outer and inner flanges and the beam portion defining generally a C-shaped part.

3. The invention according to claim 1, and the terminal portion of said lower depending flange portion and said outer flange having a load reinforcing generally horizontal inwardly directed arm.

4. The invention according to claim 1, and said lower depending flange portion having a drainage lip above said seal to protect same.

5. The invention according to claim 1, and said upper inner flange being at a higher elevation than said upper outer flange and providing means for attaching of the roof sheet thereto attendant to the protection of said upper outer flange.

6. A rear header construction for a trailer or container or the like comprising:
   a one piece aluminum extrusion beam having a lateral extension for adaptation to the rear end of the trailer or the like and being provided with an upper upstanding outer flange, an upper upstanding inner flange, and a generally intermediate horizontal beam portion defining a drainage trough, and
   a lower flange structure provided with an outer drip lip,
   seal means adjacent said drip lip and also engaging the underside of said lower structure,
   said seal having lower leg portions embracing the upper edge portions of an associated trailer door,
   said header construction adapted for connection to apertured corner fittings for transferring of drainage from the trailer end to the fittings and outwardly of the trailer.

7. A rear end container or trailer body construction or the like comprising:
   a laterally extending end header,
   a pair of end corner fittings attached to each lateral end of said header,
   corner posts extending vertically outwardly from said corner fittings,
   door means interposed between said end header and said posts,
   side sills disposed in lateral relation to one another and extending longitudinally,
   overhead roof sheet means attached to the end header and side sills,
   side sheets attached to the side headers and the posts on each side of the trailer body,
   said end header having upper upright outer and upper upright inner flange portions and a generally horizontal beam portion connected with the lower ends of the outer and inner beam portions defining an upper trough, and said fittings being provided with port means for communicating with said trough, and a lower depending flange portion extending from the beam portion and the outer flange portion to present a generally T-shaped load supporting beam structure, and sealing means between the door means and the header.

8. The invention according to claim 7, and the inner flange portion of said header providing means for securing said roof sheet means thereto.

9. The invention according to claim 7, and the upper outer flange portion of said header being at a lower elevation than the upper inner flange portion.

10. The invention according to claim 7, and the lower depending flange portion being provided with an outwardly downwardly extending drip lip above the door means.

11. The invention according to claim 7, and the lower flange portion including an inwardly directed horizontal end portion.

12. The invention according to claim 11, and the end portion of the lower flange portion having an inner upturned reinforceing flange part.

13. The invention according to claim 7, and sealing means being provided with an upwardly extending arm engageable with the outer lower portion of said lower flange portion.

14. The invention according to claim 7, and sealing means having an upwardly inwardly located upwardly directed finger engageable with the underside of said lower flange portion, said sealing means having a lower arm means adaptably engageable about the door means to provide adequate sealing means between the door means and the header.

15. The invention according to claim 7, and said end header being of a unitary aluminum extrusion.

References Cited

UNITED STATES PATENTS

| | | | |
|---|---|---|---|
| 1,874,901 | 8/1932 | Christiansen | 220—1.5 |
| 3,061,364 | 10/1962 | Tantlinger et al. | 296—137 |
| 3,085,707 | 4/1963 | Tantlinger et al. | 220—1.5 |
| 3,191,550 | 6/1965 | Adler | 105—410 X |

LEO FRIAGLIA, Primary Examiner

J. A. PEKAR, Assistant Examiner

U.S. Cl. X.R.

49—484; 52—14